(12) United States Patent
Jeong

(10) Patent No.: US 10,990,113 B2
(45) Date of Patent: *Apr. 27, 2021

(54) SYSTEM, APPARATUS AND METHOD FOR CONTROLLING PLATOONING

(71) Applicants: Hyundai Motor Company, Seoul (KR); Kia Motors Corporation, Seoul (KR)

(72) Inventor: Woo Yeol Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 387 days.

This patent is subject to a terminal disclaimer.

(21) Appl. No.: 16/007,413

(22) Filed: Jun. 13, 2018

(65) Prior Publication Data

US 2019/0179340 A1   Jun. 13, 2019

(30) Foreign Application Priority Data

Dec. 11, 2017   (KR) .......................... 10-2017-0169195

(51) Int. Cl.
```
G08G 1/00      (2006.01)
G08G 1/16      (2006.01)
G05D 1/00      (2006.01)
G05D 1/02      (2020.01)
```
(52) U.S. Cl.
CPC ......... *G05D 1/0295* (2013.01); *G05D 1/0088* (2013.01); *G08G 1/163* (2013.01); *G08G 1/166* (2013.01); *G08G 1/167* (2013.01); *G08G 1/22* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 2010/0256836 A1* | 10/2010 | Mudalige | ............... | G08G 1/164 |
| | | | | 701/2 |
| 2010/0256852 A1* | 10/2010 | Mudalige | ................. | G08G 1/22 |
| | | | | 701/24 |
| 2018/0239352 A1* | 8/2018 | Wang | .................. | B60W 30/182 |

FOREIGN PATENT DOCUMENTS

JP          2002266672 A       9/2002

* cited by examiner

*Primary Examiner* — Peter D Nolan
*Assistant Examiner* — Demetra R Smith-Stewart
(74) *Attorney, Agent, or Firm* — Slater Matsil, LLP

(57) ABSTRACT

A system for controlling platooning includes a leading vehicle and a following vehicle. The leading vehicle predicts a collision with an external object located in front of a driving lane of the leading vehicle, determines a possibility that the leading vehicle will avoid the collision based on a situation of a neighboring lane adjacent to the driving lane, and transmits information associated with the collision to the following vehicle based on the possibility that the leading vehicle will avoid the collision. The leading vehicle determines a possibility that the following vehicle will avoid its collision based on a situation of the neighboring lane and controls at least a portion of braking of the following vehicle, a lane change of the following vehicle, a change of a vehicle the following vehicle will follow, or withdrawal of the following vehicle from a platooning group.

20 Claims, 7 Drawing Sheets

SYSTEM, APPARATUS AND METHOD FOR CONTROLLING PLATOONING

CROSS-REFERENCE TO RELATED APPLICATIONS

This application claims priority to Korean Patent Application No. 10-2017-0169195, filed on Dec. 11, 2017, which application is hereby incorporated herein by reference.

TECHNICAL FIELD

The present disclosure relates to a system, apparatus, and method for providing a collision prevention strategy during platooning.

BACKGROUND

Platooning is technology of performing autonomous driving in a state where a plurality of vehicles are located at a specified interval in a row. A leading vehicle, which is foremost in a platooning line while platooning is performed, may control one or more following vehicles which follow the leading vehicle. The leading vehicle may maintain an interval between a plurality of vehicles included in the platooning line and may exchange behavior and context information of the plurality of vehicles included in the platooning line using vehicle-to-vehicle (V2V) communication.

In a conventional platooning system, the leading vehicle may have the right to control all of vehicles included in a platooning group. The following vehicle may move based on control of the leading vehicle. When the leading vehicle is in a dangerous situation such as a collision, the following vehicle which is under a control right of the leading vehicle may be in the dangerous situation together with the leading vehicle.

SUMMARY

Embodiments described in the present disclosure have been made to solve the above-mentioned problems occurring in the prior art while advantages achieved by the prior art are maintained intact.

An aspect of the present disclosure provides a system, apparatus, and method for controlling platooning to provide various strategies to a following vehicle for smooth response of the following vehicle in a dangerous situation occurred during platooning.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling platooning may include a leading vehicle and a following vehicle. The leading vehicle may be configured to predict a collision with an external object located in front of a driving lane of the leading vehicle. When the collision with the external object is predicted, the leading car can determine a possibility that the leading vehicle will avoid the collision based on a situation of a neighboring lane adjacent to the driving lane, and transmit information associated with the collision to the following vehicle based on the possibility that the leading vehicle will avoid the collision. The following vehicle may be configured to determine a possibility that the following vehicle will avoid its collision based on a situation of the neighboring lane in response to the transmission of the information associated with the collision and control at least a portion of braking of the following vehicle, a lane change of the following vehicle, a change of a vehicle the following vehicle will follow, or withdrawal of the following vehicle from a platooning group based on the information associated with the collision, transmitted from the leading vehicle, and the possibility that the following vehicle will avoid the collision.

According to an embodiment, the leading vehicle may be configured to predict the collision based on a location of the leading vehicle, a speed of the leading vehicle, a location of the external object, a speed of the external object, and a braking distance of the leading vehicle.

According to an embodiment, the leading vehicle may be configured to determine whether the leading vehicle is able to move to the neighboring lane to avoid the collision based on a location of the leading vehicle, a speed of the leading vehicle, a location of another object located in the neighboring lane, and a speed of the other object.

According to an embodiment, the leading vehicle may be configured to, when the leading vehicle is able to avoid the collision, transmit information about emergency, required deceleration, a possibility of a collision upon lane keeping, and a predicted route of the leading vehicle to the following vehicle.

According to an embodiment, the leading vehicle may be configured to, when the leading vehicle is unable to avoid the collision, transmit information about emergency, required deceleration, and a possibility of a collision upon lane keeping to the following vehicle.

According to an embodiment, the following vehicle may be configured to determine whether the following vehicle is able to move to the neighboring lane to avoid the collision based on a location of the following vehicle, a speed of the following vehicle, a location of another object located in the neighboring lane, and a speed of the other object.

According to an embodiment, the following vehicle may be configured to, when each of the leading vehicle and the following vehicle is able to avoid the collision, avoid the collision along the leading vehicle.

According to an embodiment, the following vehicle may be configured to, when the leading vehicle is able to avoid the collision and when the following vehicle is unable to avoid the collision, withdraw from the platooning group.

According to an embodiment, the following vehicle may be configured to, when the leading vehicle is unable to avoid the collision and when the following vehicle is able to avoid the collision, withdraw from the platooning group and control another vehicle in the platooning group to follow the following vehicle.

According to an embodiment, the following vehicle may be configured to, when each of the leading vehicle and the following vehicle is unable to avoid the collision, perform emergency braking.

According to another aspect of the present disclosure, an apparatus for controlling platooning may include one or more sensors configured to sense an object around the vehicle. A communication circuit is configured to communicate with another vehicle included in a platooning group including the vehicle. A processor is configured to be electrically connected with the one or more sensors and the communication circuit. The processor may be configured to receive information associated with a collision with an external object located in front of a driving lane of a leading vehicle of the platooning group from the leading vehicle using the communication circuit, to determine a possibility that the vehicle will avoid its collision based on a situation of a neighboring lane adjacent to a driving lane of the platooning group, the situation being sensed by the one or more sensors, and to control at least a portion of braking of the vehicle, a lane change of the vehicle, a change of a vehicle the vehicle will follow, or withdrawal of the vehicle from the platooning group based on the information associated with the collision, transmitted from the leading vehicle, and the possibility that the vehicle will avoid the collision.

According to an embodiment, the processor may be configured to determine whether the vehicle is able to move to the neighboring lane to avoid the collision based on a location of the vehicle, a speed of the vehicle, a location of another object located in the neighboring lane, and a speed of the other object.

According to an embodiment, the processor may be configured to, when each of the leading vehicle and the vehicle is able to avoid the collision, avoid the collision along the leading vehicle.

According to an embodiment, the processor may be configured to, when the leading vehicle is able to avoid the collision and when the vehicle is unable to avoid the collision, withdraw from the platooning group.

According to an embodiment, the processor may be configured to, when the leading vehicle is unable to avoid the collision and when the vehicle is able to avoid the collision, withdraw from the platooning group and control another vehicle in the platooning group to follow the vehicle.

According to an embodiment, the processor may be configured to, when each of the leading vehicle and the following vehicle is unable to avoid the collision, perform emergency braking.

According to another aspect of the present disclosure, a method for controlling platooning may include predicting, by a leading vehicle, a collision with an external object located in front of a driving lane of the leading vehicle. When the collision with the external object is predicted, the leading vehicle determines a possibility that the leading vehicle will avoid the collision based on a situation of a neighboring lane adjacent to the driving lane and transmits information associated with the collision to a following vehicle which follows the leading vehicle, based on the possibility that the leading vehicle will avoid the collision, determining, by the following vehicle, a possibility that the following vehicle will avoid its collision based on a situation of the neighboring lane in response to the transmission of the information associated with the collision, and controlling, by the following vehicle, at least a portion of braking of the following vehicle, a lane change of the following vehicle, a change of a vehicle the following vehicle will follow, or withdrawal of the following vehicle from a platooning group based on the information associated with the collision, transmitted from the leading vehicle, and the possibility that the following vehicle will avoid the collision.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms 1st, 2nd, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
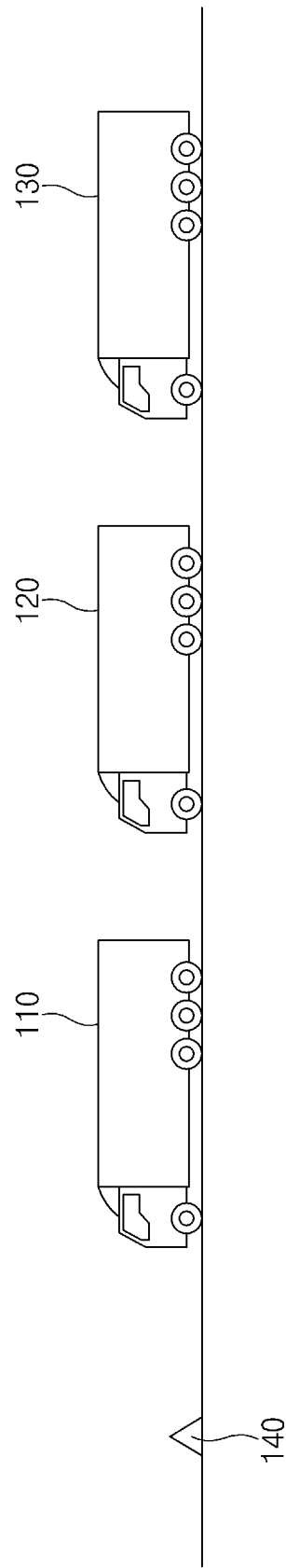
FIG. 1 is a drawing illustrating an environment where a system for controlling platooning is operated, according to an embodiment of the present disclosure.

FIG. 1 is a drawing illustrating an environment where a system for controlling platooning is operated, according to an embodiment of the present disclosure.

Referring to FIG. 1, the system for controlling platooning according to an embodiment may include a leading vehicle 110, a first following vehicle 120, and a second following vehicle 130. The leading vehicle 110, the first following vehicle 120, and the second following vehicle 130 may perform platooning. The leading vehicle no may detect an obstruction 140 in front of the leading vehicle no during the platooning. When a collision with the obstruction 140 is predicted, the leading vehicle no may avoid the collision with the obstruction 140 by performing emergency braking or may avoid the collision with the obstruction 140 by changing its driving lane.

The leading vehicle 110 may establish an avoidance strategy based on a distance between the obstruction 140 and the leading vehicle 110, a speed of the leading vehicle 110, a location and speed of another vehicle located on a lane adjacent to the leading vehicle 110, and the like. In this case, the first following vehicle 120 and the second following vehicle 130 may move based on control of the leading vehicle 110. However, when the first following vehicle 120 and the second following vehicle 130 are unilaterally controlled depending on control of the leading vehicle 110, it may be difficult for the first following vehicle 120 and the second following vehicle 130 to get out of a dangerous situation.

In the system for controlling the platooning according to an embodiment, when information associated with a collision is received from the leading vehicle 110, each of the first following vehicle 120 and the second following vehicle 130 may independently establish an avoidance strategy. Each of the first following vehicle 120 and the second following vehicle 130 may randomly withdraw from a platooning group and may change a vehicle they will follow. After temporarily withdrawing from the platooning group and independently avoiding a dangerous situation, each of the first following vehicle 120 and the second following vehicle 130 may follow the leading vehicle no again and may join the platooning group. Thus, each of the leading vehicle 110, the first following vehicle 120, and the second following vehicle 130 may smoothly respond to the dangerous situation and may maintain a platooning line through temporal withdrawal and joining.

Figure 2:
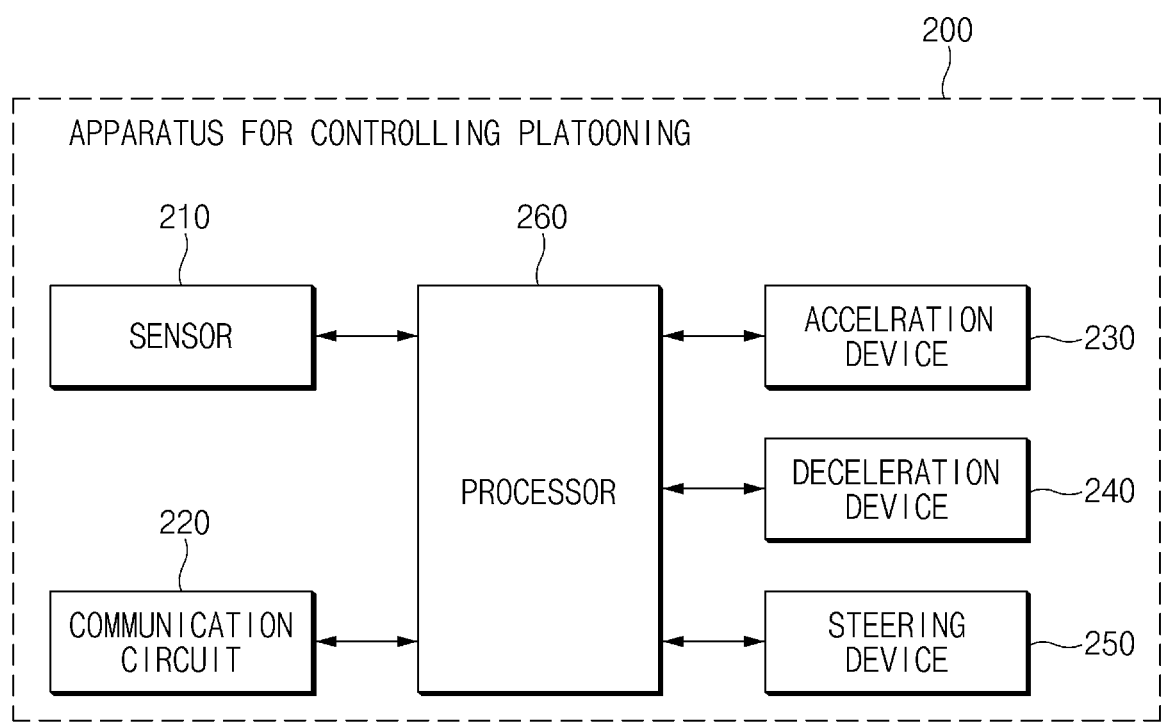
FIG. 2 is a block diagram illustrating a configuration of an apparatus for controlling platooning according to an embodiment of the present disclosure.

FIG. 2 is a block diagram illustrating a configuration of an apparatus for controlling platooning according to an embodiment of the present disclosure.

Referring to FIG. 2, an apparatus 200 for controlling platooning (hereinafter referred to as "apparatus 200" for convenience of description) according to an embodiment may include a sensor 210, a communication circuit 220, an acceleration device 230, a deceleration device 240, a steering device 250, and a processor 260. The apparatus 200 may be a system loaded into a vehicle (e.g., a leading vehicle or a following vehicle) included in a platooning group.

The sensor 210 may be configured to sense an object around the vehicle. For example, the sensor 210 may sense an obstruction or an external vehicle located in front of, beside, and behind the vehicle. The sensor 210 may sense a location, a speed, acceleration, and the like of the object. The sensor 210 may sense a speed, acceleration, a steering angle, and the like of the vehicle.

The communication circuit 220 may be configured to communicate with the external vehicle. The communication circuit 220 may communicate with another vehicle included in the platooning group including a vehicle which is loaded with the apparatus 200.

The acceleration device 230 may be an engine capable of enhancing a speed of the vehicle. The deceleration device 240 may be a brake device capable of reducing a speed of the vehicle. The steering device 250 may be a steering capable of adjusting a steering angle of the vehicle.

The processor 260 may be electrically connected with the sensor 210, the communication circuit 220, the acceleration device 230, the deceleration device 240, and the steering device 250. The processor 260 may control the sensor 210, the communication circuit 220, the acceleration device 230, the deceleration device 240, and the steering device 250 and may perform a variety of data processing and various arithmetic operations. A description will be given in detail below of the operation of the processor 260 with reference to FIG. 3.

Figure 3:
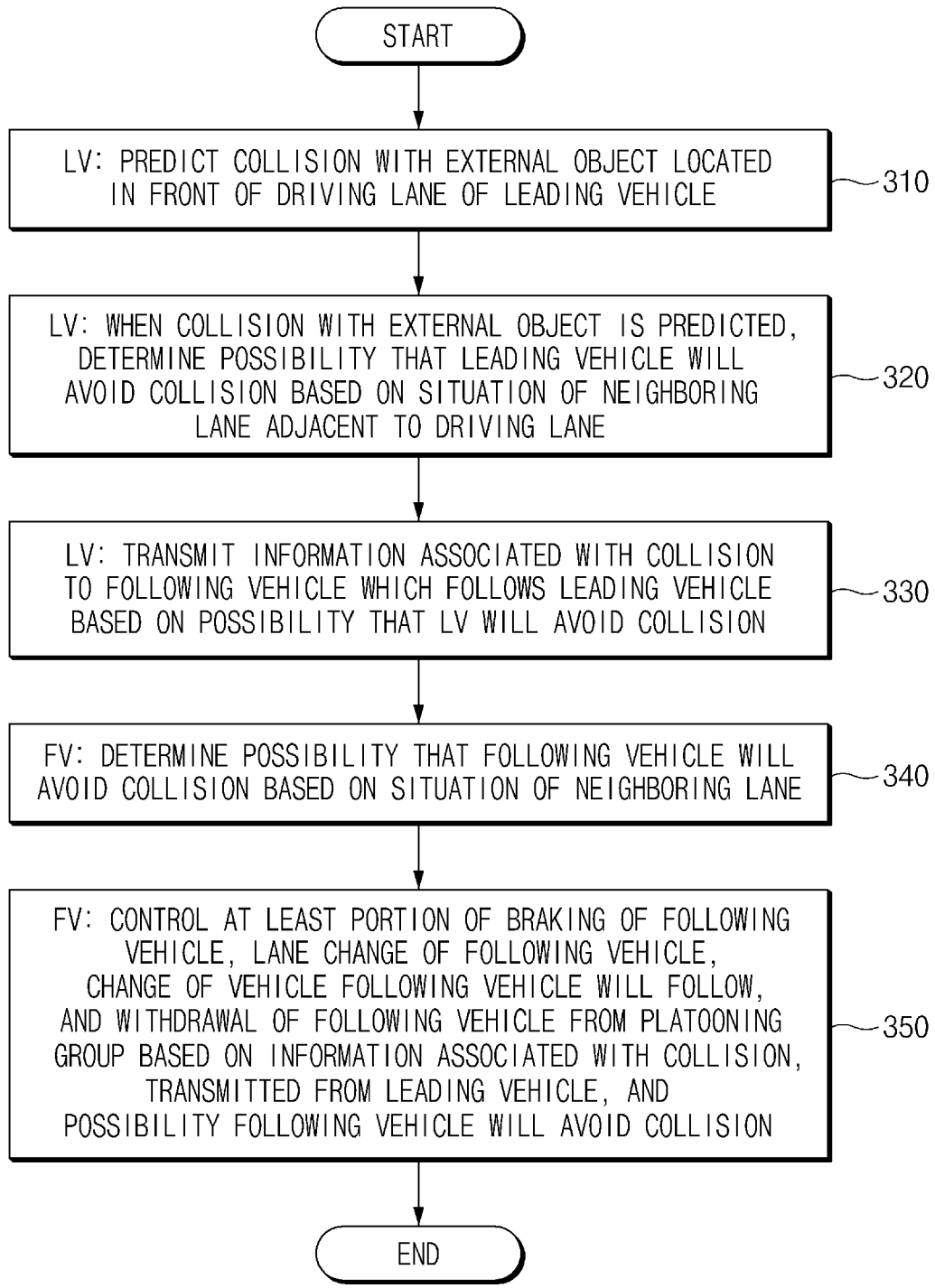
FIG. 3 is a flowchart illustrating a method for controlling platooning according to an embodiment of the present disclosure.

FIG. 3 is a flowchart illustrating a method for controlling platooning according to an embodiment of the present disclosure.

Hereinafter, it may be assumed that a leading vehicle or a following vehicle included in a system for controlling platooning according to an embodiment performs a process of FIG. 3. Further, in a description of FIG. 3, n operation described as being performed by the leading vehicle or the following vehicle may be understood as being controlled by a processor included in the leading vehicle or a processor included in the following vehicle.

Referring to FIG. 3, in operation 310, a leading vehicle LV may predict a collision with an external object located in front of a driving lane of the leading vehicle LV. According to an embodiment, the leading vehicle LV may predict the collision with the external object based on a location of the leading vehicle LV, a speed of the leading vehicle LV, a location of the external object, a speed of the external object, and a braking distance of the leading vehicle LV.

In operation 320, when the collision with the external object is predicted, the leading vehicle LV may determine a possibility that the leading vehicle LV will avoid the collision based on a situation of a neighboring lane adjacent to the driving lane. According to an embodiment, the leading vehicle LV may determine whether the leading vehicle LV is able to move to the neighboring lane to avoid the collision based on a location of the leading vehicle LV, a speed of the leading vehicle LV, a location of another object (e.g., an external vehicle) located in the neighboring lane, and a speed of the other object.

In operation 330, the leading vehicle LV may transmit information associated with the collision to a following vehicle FV which follows the leading vehicle LV based on the possibility that the leading vehicle LV will avoid the collision. According to an embodiment, when the leading vehicle LV is able to avoid the collision, it may transmit information about emergency, required deceleration, a possibility of a collision upon lane keeping, and a predicted route of the leading vehicle LV to the following vehicle FV. For example, the leading vehicle LV may transmit a notification for emergency due to the external object, required deceleration for preventing a collision, a possibility of a collision upon emergency braking in a current lane, a predicted route for a lane change of the leading vehicle LV, and the like to the following vehicle FV. According to an embodiment, when the leading vehicle LV is unable to avoid the collision, it may transmit information about emergency, required deceleration, and a possibility of a collision upon lane keeping to the following vehicle FV.

In operation 340, the following vehicle FV may determine a possibility that the following vehicle FV will avoid its collision based on a situation of the neighboring lane. According to an embodiment, the following vehicle FV may determine whether the following vehicle FV is able to move to the neighboring lane to avoid the collision based on a location of the following vehicle FV, a speed of the following vehicle FV, a location of another object located in the neighboring lane, and a speed of the other object.

In operation 350, the following vehicle FV may control at least a portion of braking of the following vehicle FV, a lane change of the following vehicle FV, a change of a vehicle the following vehicle FV will follow, or withdrawal of the following vehicle FV from a platooning group based on the information associated with the collision, transmitted from the leading vehicle LV, and the possibility that the following vehicle FV will avoid the collision. According to an embodiment, when each of the leading vehicle LV and the following vehicle FV is able to avoid the collision, the following vehicle FV may avoid the collision along the leading vehicle LV. According to an embodiment, when the leading vehicle LV is able to avoid the collision and when the following vehicle FV is unable to avoid the collision, the following vehicle FV may withdraw from the platooning group. The following vehicle FV may maintain a platooning line by withdrawing the platooning group, avoiding the collision for himself or herself, and following the leading vehicle LV again. In this case, another following vehicle which follows the following vehicle FV may follow the following vehicle FV. According to an embodiment, when the leading vehicle LV is unable to avoid the collision and when the following vehicle FV is able to avoid the collision, the following vehicle FV may withdraw from the platooning group and may control the other vehicle in the platooning group to follow the following vehicle FV. The following vehicle FV may withdraw from the platooning group and may avoid the collision for himself or herself. In this case, the following vehicle FV may control another following vehicle to follow the following vehicle FV or the leading vehicle LV. According to an embodiment, when each of the leading vehicle LV and the following vehicle FV is unable to avoid the collision, the following vehicle FV may perform emergency braking.

Figure 4:
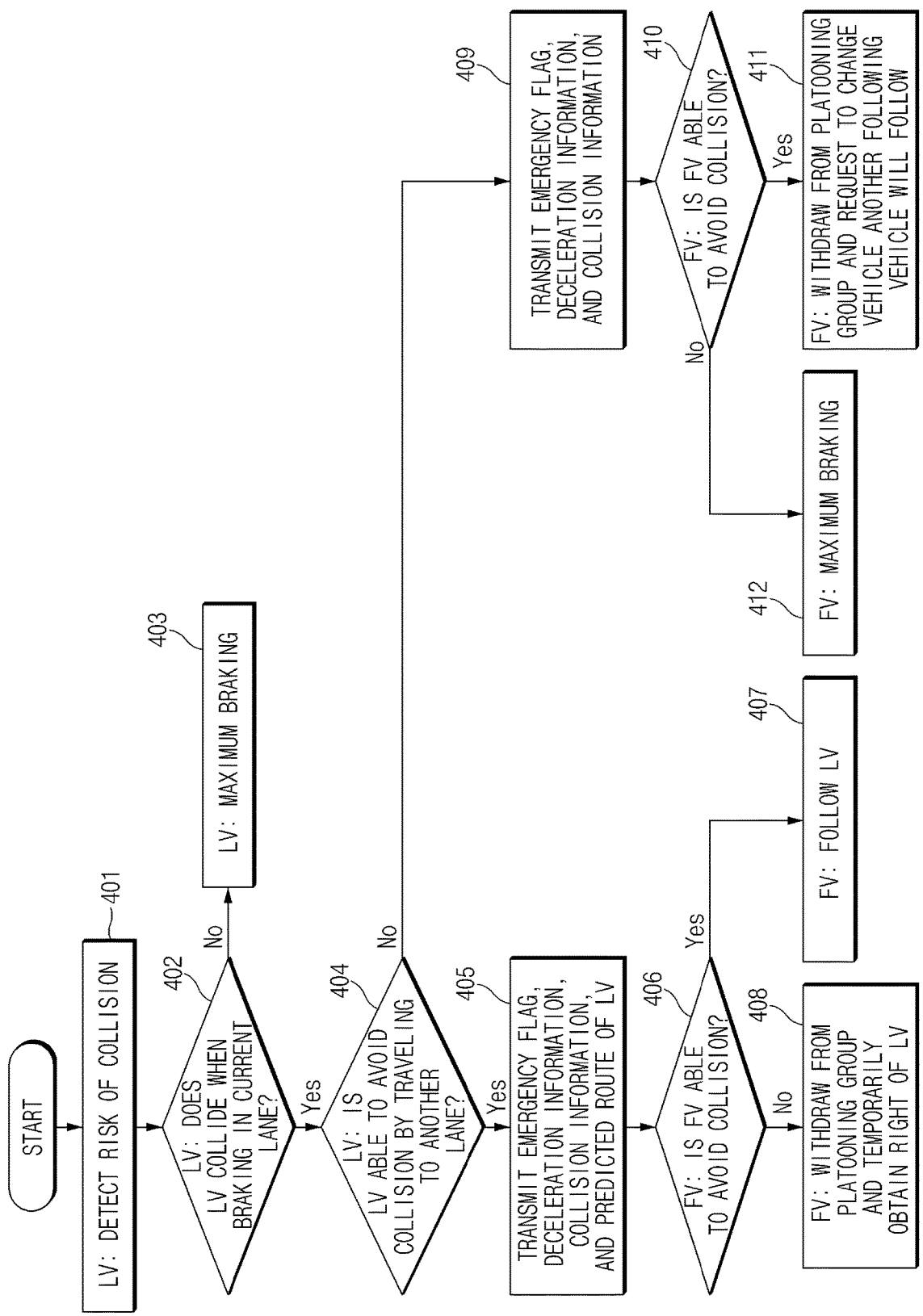
FIG. 4 is a flowchart illustrating a method for controlling platooning according to an embodiment of the present disclosure.

FIG. 4 is a flowchart illustrating a method for controlling platooning according to an embodiment of the present disclosure.

Referring to FIG. 4, in operation 401, a leading vehicle LV may detect a risk of a collision with an external object located in front of the leading vehicle LV.

In operation 402, the leading vehicle LV may determine whether to collide with the external object when braking in a current lane.

When it is determined that the leading vehicle LV does not collide with the external object in the current lane, in operation 403, the leading vehicle LV may avoid the collision through maximum braking.

When it is determined that the leading vehicle LV collies with the external object in the current lane, in operation 404, the leading vehicle LV may determine whether it is able to avoid the collision by traveling to another lane.

When the leading vehicle LV is able to avoid the collision by traveling to the other lane, in operation 405, it may transmit an emergency flag, deceleration information, collision information, a predicted route of the leading vehicle LV to a following vehicle FV. In operation 406, the following vehicle FV may determine whether it is able to avoid a collision. When the following vehicle FV is able to avoid the collision, in operation 407, it may follow the leading vehicle LV which avoids the collision. When the following vehicle FV is unable to avoid the collision, in operation 408, it may randomly withdraw from a platooning group and may temporarily obtain a right of the leading vehicle LV. The following vehicle FV may control another following vehicle to follow the following vehicle FV. After independently avoiding the collision, the following vehicle FV may follow the leading vehicle LV and may join the platooning group.

When the leading vehicle LV is unable to avoid the collision by traveling to the other lane, in operation 409, the leading vehicle LV may transmit an emergency flag, deceleration information, and collision information to the following vehicle FV. In operation 410, the following vehicle FV may determine whether it is able to avoid a collision. When the following vehicle FV is able to avoid the collision, in operation 411, it may randomly withdraw from the platooning group and may obtain a right of the leading vehicle LV. The following vehicle FV may control another following vehicle to follow the following vehicle FV or the leading vehicle LV. When the following vehicle FV is unable to avoid the collision, in operation 412, it may perform maximum braking.

Figure 5:
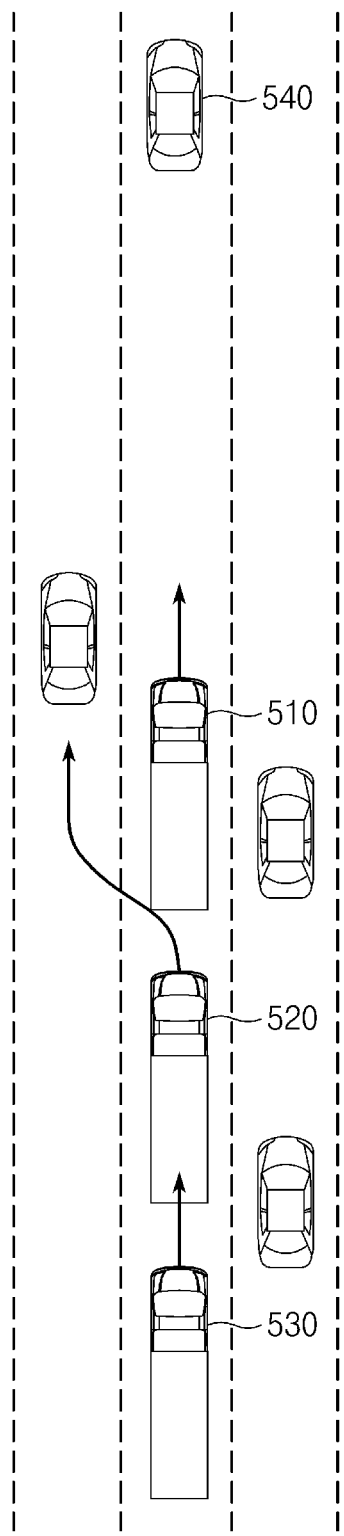
FIG. 5 is a drawing illustrating an exemplary behavior of a platooning group according to an embodiment of the present disclosure.

FIG. 5 is a drawing illustrating an exemplary behavior of a platooning group according to an embodiment of the present disclosure.

Referring to FIG. 5, a platooning system including a leading vehicle 510, a first following vehicle 520, and a second following vehicle 530 may perform platooning. The leading vehicle 510 may detect an obstruction 540 located in front of the leading vehicle 510 during the platooning. The leading vehicle 510 may determine whether it is able to brake in its driving lane without colliding with the obstruction 540. When the leading vehicle 510 is unable to avoid a collision by braking, it may determine whether it is able to avoid the collision by traveling to another lane. When the leading vehicle 510 is unable to avoid the collision by traveling to the other lane due to a vehicle around the leading vehicle 510, it may transmit an emergency flag, deceleration information, collision information, and the like to the first following vehicle 520 and the second following vehicle 530. The first following vehicle 520 may determine whether it is able to avoid a collision by traveling to another lane. When the first following vehicle 520 is able to avoid the collision by traveling to the other lane, it may randomly withdraw from a platooning group and may temporarily obtain a right of the leading vehicle 510. The first following vehicle 520 may avoid the collision by traveling to the other lane. In this case, the first following vehicle 520 may control the second following vehicle 530 to change a vehicle the second following vehicle 530 will follow from the first following vehicle 520 to the leading vehicle 510.

Figure 6:
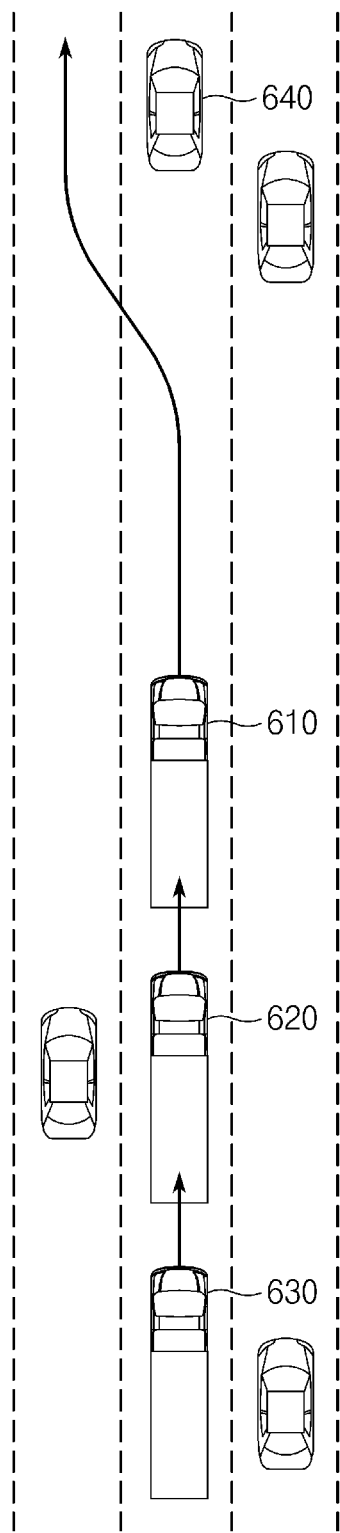
FIG. 6 is a drawing illustrating an exemplary behavior of a platooning group according to an embodiment of the present disclosure.

FIG. 6 is a drawing illustrating an exemplary behavior of a platooning group according to an embodiment of the present disclosure.

Referring to FIG. 6, a platooning system including a leading vehicle 610, a first following vehicle 620, and a second following vehicle 630 may perform platooning. The leading vehicle 610 may detect an obstruction 640 located in front of the leading vehicle 610 during the platooning. The leading vehicle 610 may determine whether it is able to brake in its driving lane without colliding with the obstruction 640. When the leading vehicle 510 is unable to avoid a collision by braking, it may determine whether it is able to avoid the collision by traveling to another lane. When the leading vehicle 610 is able to avoid the collision by traveling to the other lane, it may transmit an emergency flag, deceleration information, collision information, a predicted route of the leading vehicle 610, and the like to the first following vehicle 620 and the second following vehicle 630. The first following vehicle 620 may determine whether it is able to avoid a collision by traveling to another lane. When the first following vehicle 620 is able to avoid the collision by traveling to the other lane, it may follow the leading vehicle 610. When the first following vehicle 620 is unable to avoid the collision by traveling to the other lane due to a vehicle around the first following vehicle 620, it may randomly withdraw from a platooning group and may temporarily obtain a right of the leading vehicle 610. In this case, the second following vehicle 630 may follow the first following vehicle 620. The first following vehicle 620 may avoid the collision using the right of the leading vehicle 610 and may join the platooning group by following the leading vehicle 610 later.

Figure 7:
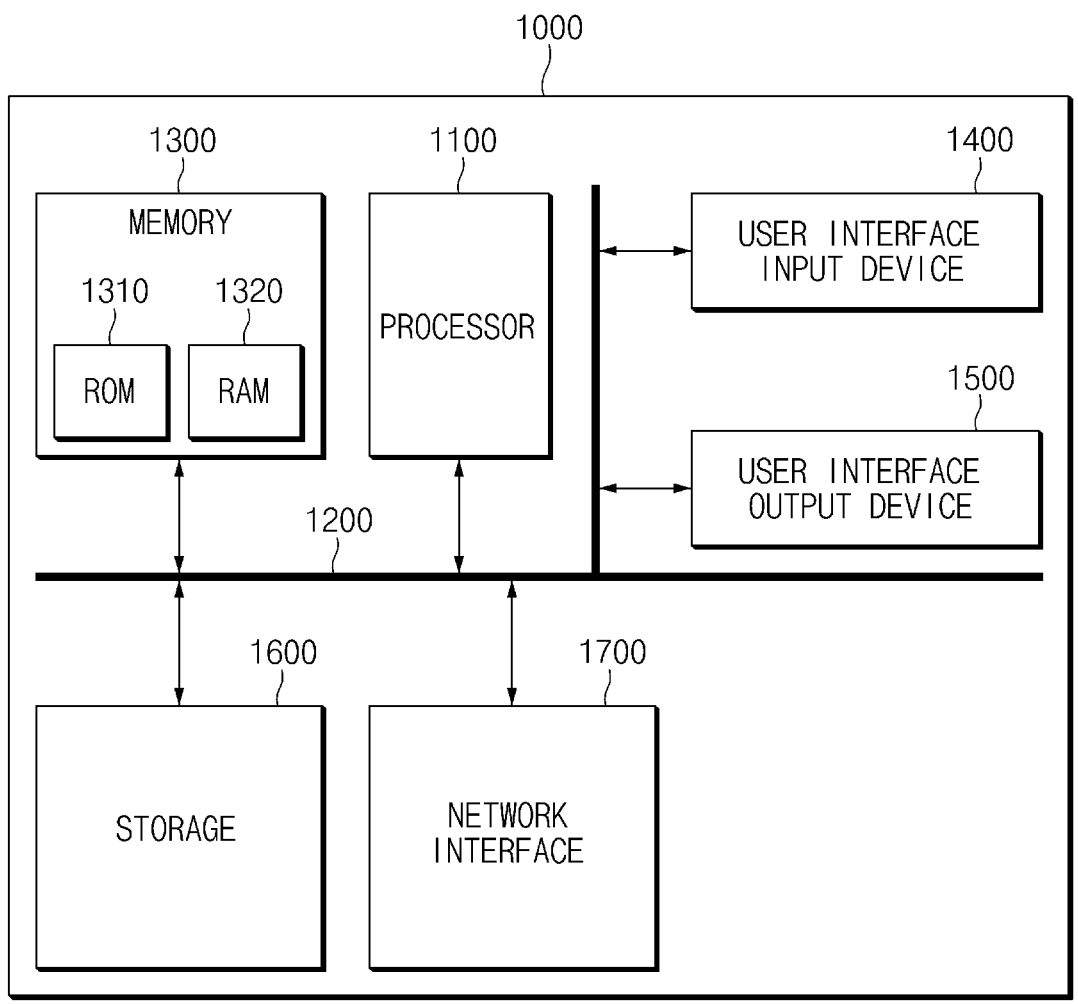
FIG. 7 is a block diagram illustrating a configuration of a computing system according to an embodiment of the present disclosure.

FIG. 7 is a block diagram illustrating a configuration of a computing system according to an embodiment of the present disclosure.

Referring to FIG. 7, the above-mentioned method according to an embodiment of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

According to an embodiment of the present disclosure, the following vehicle may safely cope with a dangerous situation by establishing a strategy for collision avoidance for itself when information associated with a collision is transmitted from the leading vehicle.

In addition, various effects indirectly or directly ascertained through the present disclosure may be provided.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A system for controlling platooning, the system comprising:
a leading vehicle; and
a following vehicle;
wherein the leading vehicle is configured to:
predict a collision with an external object located in front of a driving lane of the leading vehicle;
when the collision with the external object is predicted, determine a possibility that the leading vehicle will avoid the collision based on a situation of a neighboring lane adjacent to the driving lane; and
transmit information associated with the collision to the following vehicle based on the possibility that the leading vehicle will avoid the collision; and
wherein the following vehicle is configured to:
determine a possibility that the following vehicle will avoid its collision based on a situation of the neighboring lane in response to the transmission of the information associated with the collision; and
control at least a portion of braking of the following vehicle, a lane change of the following vehicle, a change of a vehicle the following vehicle will follow, or withdrawal of the following vehicle from a platooning group based on the information associated with the collision and the possibility that the following vehicle will avoid the collision.

2. The system of claim 1, wherein the leading vehicle is configured to predict the collision based on a location of the leading vehicle, a speed of the leading vehicle, a location of the external object, a speed of the external object, and a braking distance of the leading vehicle.

3. The system of claim 1, wherein the leading vehicle is configured to determine whether the leading vehicle is able to move to the neighboring lane to avoid the collision based on a location of the leading vehicle, a speed of the leading vehicle, a location of an other object located in the neighboring lane, and a speed of the other object.

4. The system of claim 3, wherein the leading vehicle is configured to, when the leading vehicle is able to avoid the collision, transmit information about emergency, required deceleration, a possibility of a collision upon lane keeping, and a predicted route of the leading vehicle to the following vehicle.

5. The system of claim 3, wherein the leading vehicle is configured to, when the leading vehicle is unable to avoid the collision, transmit information about emergency, required deceleration, and a possibility of a collision upon lane keeping to the following vehicle.

6. The system of claim 1, wherein the following vehicle is configured to determine whether the following vehicle is able to move to the neighboring lane to avoid the collision based on a location of the following vehicle, a speed of the following vehicle, a location of an other object located in the neighboring lane, and a speed of the other object.

7. The system of claim 1, wherein the following vehicle is configured to avoid the collision along with the leading vehicle when both the leading vehicle and the following vehicle are able to avoid the collision.

8. The system of claim 1, wherein the following vehicle is configured to withdraw from the platooning group when the leading vehicle is able to avoid the collision and when the following vehicle is unable to avoid the collision.

9. The system of claim 1, wherein the following vehicle is configured to:
withdraw from the platooning group when the leading vehicle is unable to avoid the collision and when the following vehicle is able to avoid the collision; and
control another vehicle in the platooning group to follow the following vehicle.

10. The system of claim 1, wherein the following vehicle is configured to perform emergency braking when both the leading vehicle and the following vehicle are unable to avoid the collision.

11. An apparatus for controlling platooning in a vehicle, the apparatus comprising:
one or more sensors configured to sense an object around the vehicle;

a communication circuit configured to communicate with another vehicle included in a platooning group including the vehicle; and a processor configured to be electrically connected with the one or more sensors and the communication circuit, wherein the processor is configured to:

receive information associated with a collision with an external object located in front of a driving lane of a leading vehicle of the platooning group from the leading vehicle using the communication circuit;

determine a possibility that the vehicle will avoid collision based on a situation of a neighboring lane adjacent to a driving lane of the platooning group, the situation being sensed by the one or more sensors; and control at least a portion of braking of the vehicle, a lane change of the vehicle, a change of a vehicle the vehicle will follow, or withdrawal of the vehicle from the platooning group based on the information associated with the collision and the possibility that the vehicle will avoid the collision.

12. The apparatus of claim 11, wherein the processor is configured to determine whether the vehicle is able to move to the neighboring lane to avoid the collision based on a location of the vehicle, a speed of the vehicle, a location of an other object located in the neighboring lane, and a speed of the other object.

13. The apparatus of claim 11, wherein, when the vehicle is a following vehicle that is following a leading vehicle, the processor is configured to avoid the collision along with the leading vehicle when both the leading vehicle and the vehicle are able to avoid the collision.

14. The apparatus of claim 11, wherein, when the vehicle is a following vehicle that is following a leading vehicle, the processor is configured to withdraw from the platooning group when the leading vehicle is able to avoid the collision and when the vehicle is unable to avoid the collision.

15. The apparatus of claim 11, wherein, when the vehicle is a following vehicle that is following a leading vehicle, the processor is configured to:

withdraw from the platooning group when the leading vehicle is unable to avoid the collision and when the vehicle is able to avoid the collision; and control another vehicle in the platooning group to follow the vehicle.

16. The apparatus of claim 11, wherein the processor is configured to perform emergency braking when both the leading vehicle and the following vehicle are unable to avoid the collision.

17. A method for controlling platooning, the method comprising:

predicting, by a leading vehicle, a collision with an external object located in front of a driving lane of the leading vehicle;

when the collision with the external object is predicted, determining, by the leading vehicle, a possibility that the leading vehicle will avoid the collision based on a situation of a neighboring lane adjacent to the driving lane;

transmitting, by the leading vehicle, information associated with the collision to a following vehicle that follows the leading vehicle, the information based on the possibility that the leading vehicle will avoid the collision;

determining, by the following vehicle, a possibility that the following vehicle will avoid a collision based on a situation of the neighboring lane in response to the transmission of the information associated with the collision; and controlling, by the following vehicle, at least a portion of braking of the following vehicle, a lane change of the following vehicle, a change of a vehicle the following vehicle will follow, or withdrawal of the following vehicle from a platooning group based on the information associated with the collision and the possibility that the following vehicle will avoid the collision.

18. The method of claim 17, wherein predicting the collision comprises predicting the collision based on a location of the leading vehicle, a speed of the leading vehicle, a location of the external object, a speed of the external object, and a braking distance of the leading vehicle.

19. The method of claim 17, wherein determining the possibility that the following vehicle will avoid the collision comprises determining whether the following vehicle is able to move to the neighboring lane to avoid the collision based on a location of the following vehicle, a speed of the following vehicle, a location of an other object located in the neighboring lane, and a speed of the other object.

20. The method of claim 17, wherein the controlling comprises withdrawing from the platooning group when the leading vehicle is able to avoid the collision and when the following vehicle is unable to avoid the collision.

* * * * *